US012639343B2

(12) United States Patent
Barmettler et al.

(10) Patent No.: US 12,639,343 B2
(45) Date of Patent: May 26, 2026

(54) RULE-BASED DECONFLICTION OF OVERLAPPING DATA

(71) Applicants: AT&T Intellectual Property I, L.P., Atlanta, GA (US); AT&T Mobility II LLC, Atlanta, GA (US)

(72) Inventors: Edmund Barmettler, Round Rock, TX (US); Adam Gentry, Danville, CA (US); Claudia Smith, Austin, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 745 days.

(21) Appl. No.: 18/061,437

(22) Filed: Dec. 3, 2022

(65) Prior Publication Data

US 2024/0185097 A1 Jun. 6, 2024

(51) Int. Cl.
*G06F 7/00* (2006.01)
*G06F 16/332* (2019.01)

(52) U.S. Cl.
CPC .................................. *G06F 16/332* (2019.01)

(58) Field of Classification Search
CPC ...................................................... G06F 16/332
USPC .................................................. 707/600–899
See application file for complete search history.

(56) References Cited

U.S. PATENT DOCUMENTS

2022/0237194 A1* 7/2022 Patel ....................... G06F 16/26

* cited by examiner

*Primary Examiner* — Isaac M Woo

(57) ABSTRACT

Methods, computer readable media, and devices for rule-based deconfliction of overlapping data are disclosed. An example method performed by a processing system including at least one processor includes defining, with guidance from a human subject matter expert, a rule for resolving a conflict between a plurality of conflicting items of data, aggregating data from a plurality of data sources into a single pool of data, detecting a set of conflicting data items in the single pool of data, and ranking data items in the set of conflicting data items, using the rule.

20 Claims, 3 Drawing Sheets

<u>200</u>

200

300

RULE-BASED DECONFLICTION OF OVERLAPPING DATA

The present disclosure relates generally to data storage, and relates more particularly to devices, non-transitory computer-readable media, and methods for rule-based deconfliction of overlapping data.

BACKGROUND

Enterprise data (e.g., data associated with different departments, systems, tools, services, and applications of an enterprise) is constantly being generated from different sources within an enterprise. Often, this enterprise data is stored across multiple different locations, such as across multiple different databases and/or applications, and in multiple different formats.

SUMMARY

The present disclosure broadly discloses methods, computer-readable media, and systems for rule-based deconfliction of overlapping data. In one example, a method performed by a processing system including at least one processor includes defining, with guidance from a human subject matter expert, a rule for resolving a conflict between a plurality of conflicting items of data, aggregating data from a plurality of data sources into a single pool of data, detecting a set of conflicting data items in the single pool of data, and ranking data items in the set of conflicting data items, using the rule.

In another example, a non-transitory computer-readable medium may store instructions which, when executed by a processing system including at least one processor, cause the processing system to perform operations. The operations may include defining, with guidance from a human subject matter expert, a rule for resolving a conflict between a plurality of conflicting items of data, aggregating data from a plurality of data sources into a single pool of data, detecting a set of conflicting data items in the single pool of data, and ranking data items in the set of conflicting data items, using the rule.

In another example, a device may include a processing system including at least one processor and a non-transitory computer-readable medium storing instructions which, when executed by the processing system, cause the processing system to perform operations. The operations may include defining, with guidance from a human subject matter expert, a rule for resolving a conflict between a plurality of conflicting items of data, aggregating data from a plurality of data sources into a single pool of data, detecting a set of conflicting data items in the single pool of data, and ranking data items in the set of conflicting data items, using the rule.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for rule-based deconfliction of overlapping data. As discussed above, enterprise data (e.g., data associated with different departments, systems, tools, services, and applications of an enterprise) is constantly being generated from different sources within an enterprise. Often, this enterprise data is stored across multiple different locations, such as across multiple different databases and/or applications, and in multiple different formats. Some of this data may conflict (e.g., two or more items of data may contradict each other or be duplicative (e.g., two or more items of data may be redundant). Thus, gathering, analyzing, and reporting on the enterprise data often means having to merge the data from multiple sources, and having to clean, filter, and "tune" the data to remove any conflicts that the data might generate in downstream models.

Often, merging and deconflicting of the data requires significant manual effort. For instance, when attempting to solve issues that result from conflicting data, the conflicting data typically must be exported into spreadsheets and deconflicted by humans who visually inspect the data. This process may be very tedious and very expensive, and, because the process is human-driven, may still be susceptible to human error. In some cases, basic or broad automation (such as macros) may simplify the deconfliction process somewhat, but a good deal of manual effort is still required.

Examples of the present disclosure provide a hybrid method for data collection, aggregation, and deconfliction that provides both the benefits of manual review by human subject matter experts and the scalability of automated solutions. In one example, rules are developed by human subject matter experts and implemented when conflicting items of data are detected. The rules automatically analyze and rank the conflicting data items, thereby providing an identification of a "most likely correct" data item without discarding the remaining data items. This allows users to define in advance how to resolve conflicts in data sets, before the conflicts are detected. Moreover, the rules may be updated to reflect changes in the data, schemas, and nomenclature over time. These and other aspects of the present disclosure are discussed in greater detail below in connection with the examples of FIGS. 1-3.

Figure 1:
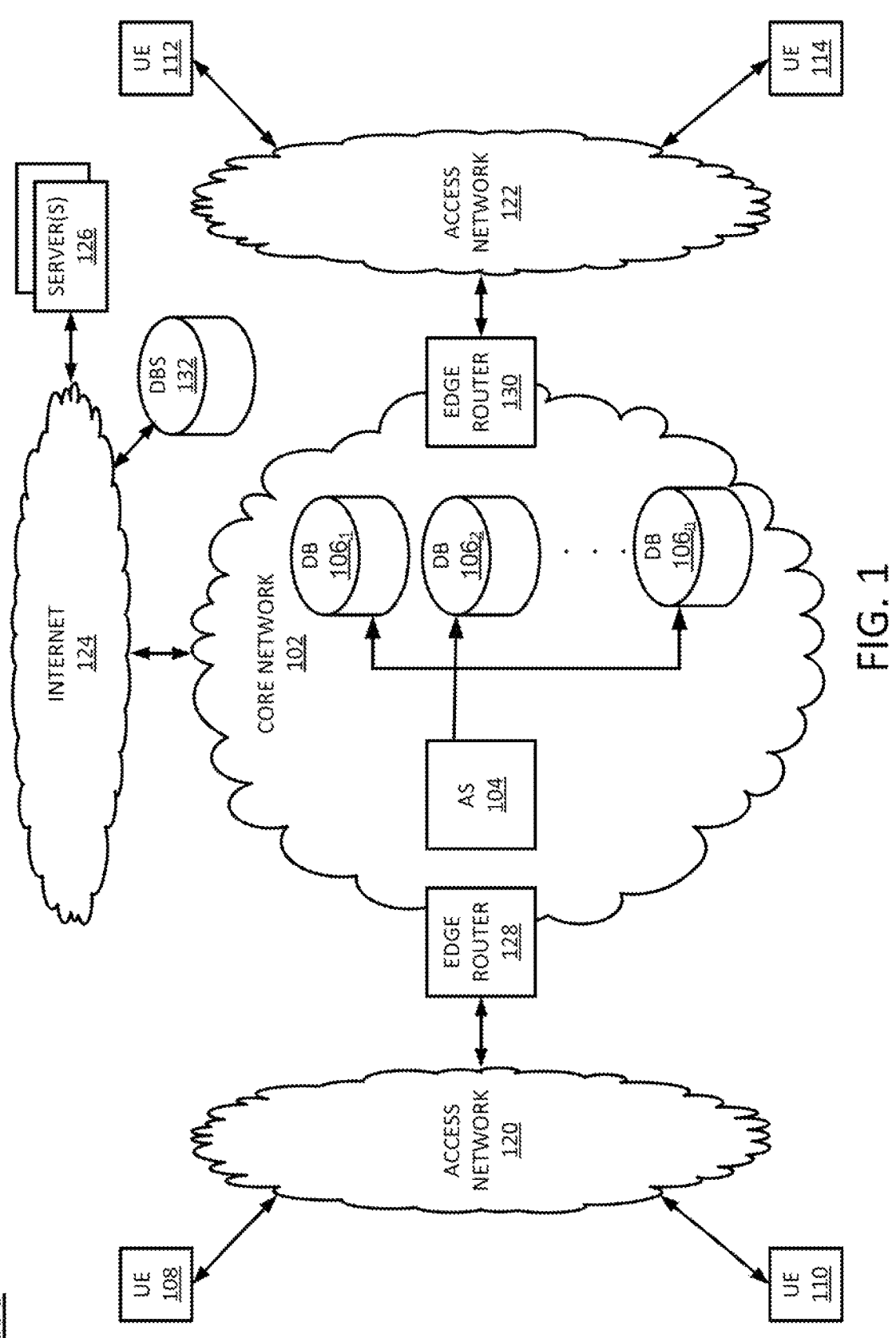
FIG. 1 illustrates an example system in which examples of the present disclosure for rule-based deconfliction of overlapping data may operate.

To further aid in understanding the present disclosure, FIG. 1 illustrates an example system 100 in which examples of the present disclosure for rule-based deconfliction of overlapping data may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/ Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a plurality of databases (DBs) $106_1$-$106_n$ (hereinafter individually referred to as a "DB 106" or collectively referred to as "DBs 106"), and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of the core network 102 may provide a cable television service, an IPTV service, a streaming service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable automatically or by a human user to execute a software application that queries a pool of data, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with various data sources including proprietary data sources (e.g., various databases and systems of an enterprise) and public data sources (e.g., the World Wide Web).

Figure 3:
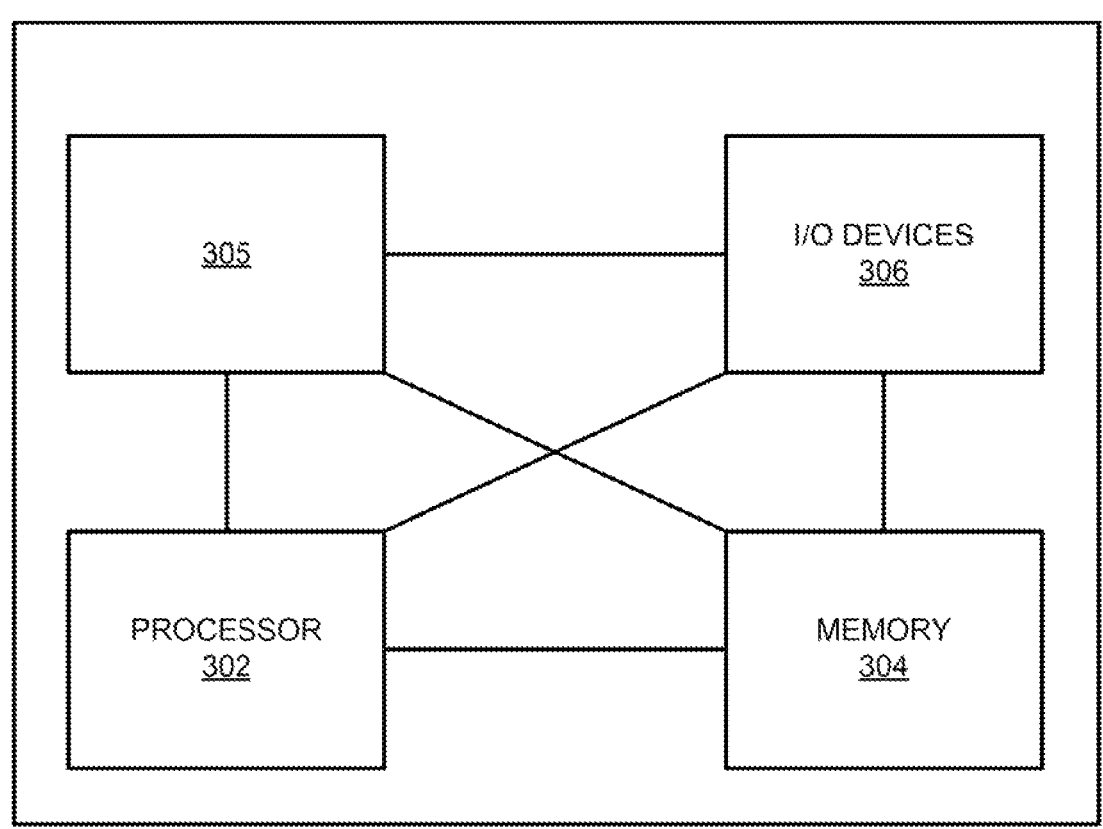
FIG. 3 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for rule-based deconfliction of overlapping data, as described herein. The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 104 may be configured to collect data items from a plurality of data sources, including DBs 106, DBs 132, and/or other data sources, and to aggregate the data items into a single pool of data. Aggregation of the data items may include normalization of the data items, so that all data items in the single pool of data conform to a common format.

The AS 104 may be further configured to define rules for resolving conflicts between subsets of the data items in the single pool of data. For instance, two or more data items in the single pool of data may contain information that cannot simultaneously be true (e.g., information that is contradictory). In one example, human subject matter experts may operate one or more of the user endpoint devices 108, 110, 112, and 114 to access a software application that allows the human subject matter experts to define rules. A rule defined by a human subject matter expert in this manner may specify how to resolve conflicts between two or more data items in the single pool of data.

For instance, in one example, a rule may specify how to rank the two or more data items, where the ranking indicates the relative reliability of the two or more data items. As an example, a human subject matter expert who is an expert on an enterprise's inventory systems may know that the enterprise's primary inventory system tends to contain more up to date information than the enterprise's secondary inventory systems. In this case, the human subject matter expert may define a rule that specifies that when a data item obtained from the primary inventory system is in conflict with a data item obtained from the secondary inventory system, the primary inventory system should be trusted more than the secondary inventory system (e.g., the data item obtained from the primary inventory system should be ranked more highly than the data item obtained from the secondary inventory system). Ranking the conflicting data items allows the most reliable (e.g., most likely to be correct) data item to be identified, while retaining the information in the conflicting data items (e.g., in case the most reliable data item is not actually correct). The AS 104 may store any rules generated in this manner locally, or may store the rules in one of the DBs 106.

The AS 104 may also be configured to apply the rules that are generated. Thus, when conflicting data items are detected in the single pool of data, the conflict can be resolved in an automated manner by applying an appropriate rule, without requiring manual review that may be expensive, time consuming, and susceptible to error.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for rule-based deconfliction of overlapping data, as described herein. One example method for rule-based deconfliction of overlapping data is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
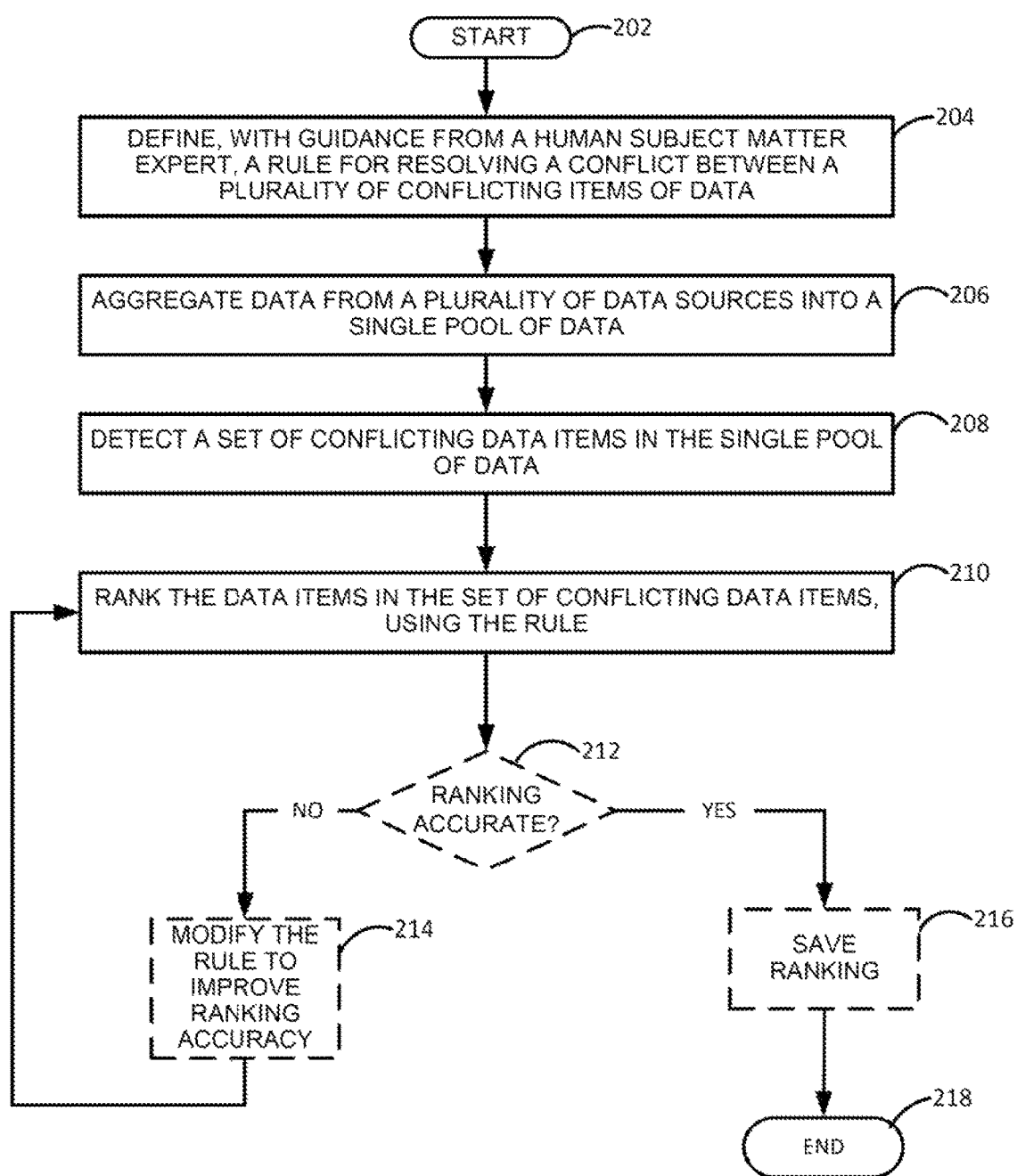
FIG. 2 illustrates a flowchart of an example method for rule-based deconfliction of overlapping data, in accordance with the present disclosure.

FIG. 2 illustrates a flowchart of an example method 200 for rule-based deconfliction of overlapping data, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 300, and/or a processing system 302 (e.g., having at least one processor) as described in connection with FIG. 3 below. For instance, the computing device 300 may represent at least a portion of the AS 104 in accordance with the present disclosure. For illustrative purposes, the method 200 is described in greater detail below in connection with an example performed by a processing system, such as processing system 302.

The method 200 begins in step 202 and proceeds to step 204. In step 204, the processing system may define, with guidance from a human subject matter expert, a rule for resolving a conflict between a plurality of conflicting items of data.

In one example, the human subject matter expert may be an expert in a subject to which the plurality of conflicting items of data pertains. For instance, the subject may comprise world history, baseball, biochemistry, or any other subjects. In one example, step 204 may involve a plurality of subject matter experts, each of whom may be an expert in a different subject, helping to define rules for resolving data conflicts between items of data pertaining to their respective subject of expertise.

In one example, the conflicting items of data may comprise two or more items of data that provide different or contradictory answers to the same query, different or contradictory values for a same data attribute, or the like (e.g., the two or more items of data cannot simultaneously be true). For instance, a first item of data may indicate that a specific individual was born in 1977, while a second item of data may indicate that the same specific individual was born in 1979. In this case, the first item of data and the second item of data conflict, because the first item of data and the second item of data cannot simultaneously be true. In another example, a first item of data may indicate that a current status of a project is "pending," while a second item of data may indicate that the current status of the project is "complete." In another example, a first item of data may indicate that a shipped item is "in transit," while a second item of data may indicate that the shipped item has been "delivered," and third item of data may indicate that the shipped item is "out for delivery."

In one example, the rule may specify how to rank the plurality of items of data (e.g., where the ranking may order the plurality of items of data in descending order from most reliable to least reliable). In one example, the rule may prioritize items of data based on the respective sources of the items of data (e.g., items of data from Source A are always ranked more highly than items of data from Source B, while items of data from Source B are always ranked more highly than items of data from Source C and so on). In this case, the human subject matter expert may know that certain data sources are more likely to be updated in a more timely manner, for instance. In another example, the rule may prioritize items of data based on the respective ages of the items of data (e.g., always rank the item of data that was created more recently more highly). In this case, the human subject matter expert may know that the relevant data is time sensitive, and older data may reflect information that is more likely to be out of date.

In further examples, the rule may specify other criteria that dictate how the plurality of items of data should be ranked. These other criteria may include, but are not limited to: the granularity of the content of the plurality of data items (e.g., date specified in MM/DD/YYYY format as opposed to YYYY), rule-set logical evaluations (e.g., define A, and, if X and Y are met, then pick Z over A), majority rule frequency of the plurality of data items (e.g., source A, source B, and source C all contain the same item of data, but source D contains a different item of data), or a frequency or "freshness" of the plurality of data items (e.g., source A and source B both contain an update recorded on the same date, but source A receives updates more often than source B and could be ranked higher because source A is more active, or, conversely, source B may be ranked higher since source A could be considered more volatile). It should be noted that any of the criteria disclosed for ranking the plurality of data items may be applied individually or in combination with other criteria (including criteria not explicitly discussed herein).

In one example, the rules may be stored in a ruleset or ruleset database. In a further example, each rule in the ruleset may be associated with metadata. The metadata may indicate, for a given rule, the subject(s) to which the rule pertains (e.g., world history, baseball, biochemistry, or the like), the date on which the rule was created, the date on which the rule was last modified, the subject matter expert(s) who helped to define the rule, a rating indicating the rule's usefulness in deconflicting data in the past, and/or other information.

In step 206, the processing system may aggregate data from a plurality of data sources into a single pool of data. As discussed above, data may be stored across a plurality of different locations, and in a plurality of different formats and/or according to a plurality of different schemas. For instance, an enterprise may store different data related to the enterprise across different databases or systems (e.g., disparate inventory system(s), billing system(s), human resources system(s), document management system(s), etc.). As an example, a communications service provider may maintain more than one billing system, such as individually billings systems for consumer wireless services, business wireline services, business wireless services, and the like (where consumer data may span one or more of these multiple billings systems and may be stored in different formats in each). As another example, an enterprise may acquire another enterprise, and as a result may acquire additional inventory and/or human resources systems. Moreover, in human resources systems, if each enterprise employed the same resources at different times, the data concerning those same resources (e.g., legal first name versus nickname, maiden name versus married name, middle initial versus middle name, etc.) could conflict. In each of these databases or systems, the data may be stored in a different format. For instance, one system may store dates in the form of MM-DD-YYYY, while another system may store dates in the form of DD-MM-YYYY. In one example, all of the data across all of the sources is aggregated into the single pool of data. Aggregation of this disparate data may involve normalizing some of the items of data so that all of the data in the single pool of data conforms to a common format.

In step 208, the processing system may detect a set of conflicting data items in the single pool of data. As discussed above, in one example conflicting data items may comprise data items that cannot simultaneously be true. For instance, conflicting data items may contradict each other, or provide different answers to the same query. For instance, a first item of data may indicate that a specific individual was born in 1977, while a second item of data may indicate that the same specific individual was born in 1979. In this case, the first item of data and the second item of data conflict, because the first item of data and the second item of data cannot simultaneously be true.

In step 210, the processing system may rank the data items in the set of conflicting data items, using the rule. As discussed above, the rule may be defined with guidance from a subject matter expert and may indicate an order in which data items are to be ranked. The ranking may indicate the relative reliability of the data items (e.g., which data items are more or less likely to be correct). The ranking may be based on the respective sources of the data items, the respective ages of the data items, and/or on other criteria.

In one example, ranking the data items in the set of conflicting data items may first involve identifying the appropriate rule to be applied. As discussed above, a plurality of rules for handling conflicting data may be defined under the guidance of a plurality of different subject matter experts and stored in a ruleset. In one example, metadata associated with the data items may indicate a subject to which the data items pertain (e.g., world history, baseball, biochemistry). In one example, the processing system may match this metadata to metadata associated with a rule stored in the ruleset.

As discussed above, ranking the data items in the set of conflicting data items allows the best possible data item (e.g., answer to a query) to be identified, while still retaining other potential data items.

In optional step 212 (illustrated in phantom), the processing system may determine whether the ranking is accurate. In one example, the determination as to whether the ranking is accurate may be made in accordance with feedback from a human subject matter expert (who may or may not be the same human subject matter expert who helped to guide the creation of the rule), where the human subject matter expert has expertise in the subject to which the set of conflicting data items pertains. In this case, the ranking may be forwarded to the human subject matter expert for review. The human subject matter expert may be selected or identified based on metadata associated with one or more of the items of data in the set of conflicting data items. In further examples, the accuracy of the ranking may be evaluated in an automated manner. For instance, ranking accuracy could be determined through automated reporting using generated metrics such as anomaly/outlier detection, data fingerprinting, competing models comparison (to identify discrepancies and/or accuracies when compared against each other to generate a confidence index which can be leveraged for deconfliction accuracy), and/or data volatility (e.g., where rankings may shift more frequently or more quickly than a threshold speed or frequency).

In one example, the human subject matter expert may provide a simple "yes" or "no" answer (e.g., yes, the ranking is accurate, or no, the ranking is not accurate). In another example, where the human subject matter expert indicates that the ranking is not accurate, the human subject matter expert may provide an alternative ranking of the set of conflicting data items, where the alternative ranking indicates how the human subject matter expert would have ranked the items of data in the set of conflicting data items.

If the processing system concludes in step 212 that the ranking is not accurate, then the method 200 may proceed to step 214. In optional step 214 (illustrated in phantom), the processing system may modify the rule to improve an accuracy of the ranking.

For instance, if the ranking is determined not to be accurate based on feedback from a human subject matter expert, the human subject matter expert may have provided an alternative ranking, as discussed above. In this case, the rule may be modified in a manner that would cause application of the rule to the set of conflicting data items to result in the alternative ranking. For instance, the modification may involve prioritizing the sources of the data items differently (e.g., prioritize source B over source A, instead of the other way around), prioritizing the ages of the data items differently (e.g., give greater deference to older data items when a specific subject is involved), or the like. As such, the rule(s) may evolve to maintain alignment with evolving business logic.

In some examples, the human subject matter expert may specify the exact modifications to be made to the rule, rather than the processing system inferring the modifications from an alternative ranking of the data items.

The method 200 may then return to step 210 and proceed as described above, repeating the ranking with the modified rule one or more times until the processing system concludes that the ranking is accurate.

If, however, the processing system concludes in step 212 that the ranking is accurate, then the method 200 may proceed to step 216. In optional step 216 (illustrated in phantom), the processing system may save the ranking results.

Saving the ranking results may allow queries on the data to be resolved more rapidly. For instance, a user may submit a query to the data sources from which the data was collected, and multiple potential conflicting answers to the query may be identified. As discussed above, the multiple potential conflicting answers may be ranked prior to the query being received, and the ranking may be provided to the user in response to the query.

In some examples, the rankings that are generated in accordance with the rules may serve as valuable input for future predictive training of the processing system, which helps to further automate the method 200. As the processing system continues to leverage the predefined rules and as more rules are defined, the processing system may be able to further automate even some of the steps that previously utilized human assistance or feedback. For instance, the processing system may learn to generate rules without the assistance of human subject matter experts. In one example, the rules that have been generated by subject matter experts, as well as rankings that have been generated using those rules, may be used to train a machine learning model. The trained machine learning model may then take as input a set of conflicting data items and may generate as an output a predicted rule for ranking the set of conflicting data items.

In one example, the machine learning model may be one or more of a support vector machine (SVM), a neural network, a regression model, a classifier, a clustering model, a dimensionality reduction model, an ensemble method, a deep learning model, a transfer learning model, or a reinforcement learning model.

The method 200 may end in step 218.

However, in some examples, one or more of steps 204-216 may be repeated. For instance, new rules may be made available to the processing system, which may enable data conflicts for which there was no previous guidance to be resolved. New data items may be acquired from one or more data sources, which may lead to the creation of conflicts that did not previously exist. Existing data items may be changed, which may also lead to the creation of conflicts that did not previously exist. Existing, previously undetected conflicts may be detected and resolved. As such, in some examples, the processing system may continuously iterate through steps 204-216.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, examples of the present disclosure provide a hybrid method for data collection, aggregation, and deconfliction that provides both the benefits of manual review by human subject matter experts and the scalability of automated solutions. In one example, rules are developed by human subject matter experts and implemented when conflicting items of data are detected. The rules automatically analyze and rank the conflicting data items, thereby providing an identification of a "most likely correct" data item without discarding the remaining data items. This allows users to define in advance how to resolve conflicts in data sets, before the conflicts are detected. Moreover, the rules may be updated to reflect changes in the data, schemas, and nomenclature over time.

As such, dynamic human feedback can be integrated into the deconfliction process without actually requiring real time manual review or conventional extract/transform/load functions. Through the creation of complex, expert-guided rulesets, programmatic decisions can be defined separately from the real time processing of data. Human intuition can be simulated to prioritize the best answers when data items conflict, without continual human engagement and feedback.

Examples of the present disclosure can be used to deconflict virtually any "object and attribute" data set. For instance, examples of the present disclosure could be used to deconflict data maintained in an enterprise's primary and secondary inventory systems (which may include manually updated spreadsheets and inventory data that is a by-product of some other purpose or tool). In this case, examples of the present disclosure may predict the best or most accurate data for use in reports, analytics, and dashboards. However, use cases are not limited to inventory. For instance, in further examples, examples of the present disclosure may be used to deconflict project status details from different and overlapping management tools, where data such as milestone dates may be in conflict.

Further examples of the present disclosure may be enhanced with a predictive ruleset modeling capability that uses machine learning to replace or augment human-guided ranking definitions.

Still further examples of the present disclosure may be enhanced by determining the minimal data processing that is required via change detection (e.g., through hashing to support ranking data at scale). Additionally, since human subject matter experts may not always agree on rankings, an enhanced node grouping mechanism may enable examples of the present disclosure to programmatically categorize data using self-defined rules.

FIG. 3 depicts a high-level block diagram of a computing device or processing system specifically programmed to perform the functions described herein. As depicted in FIG. 3, the processing system 300 comprises one or more hardware processor elements 302 (e.g., at least one central processing unit (CPU), a microprocessor, or a multi-core processor), a memory 304 (e.g., random access memory (RAM) and/or read only memory (ROM)), a module 305 for rule-based deconfliction of overlapping data, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for rule-based deconfliction of overlapping data (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for rule-based deconfliction of overlapping data (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

defining, by a processing system including at least one processor and with guidance from a first user, a rule for resolving a conflict between a plurality of conflicting items of data, wherein the plurality of conflicting items of data comprises two or more items of data that cannot simultaneously be true;

aggregating, by the processing system, data from a plurality of data sources into a single pool of data;

detecting, by the processing system, a set of conflicting data items in the single pool of data;

ranking, by the processing system, data items in the set of conflicting data items, using the rule, wherein the ranking ranks the data items in the set of conflicting data items into a ranking of descending order from most reliable to least reliable; and training, by the processing system, a machine learning model to predict a new rule for resolving another conflict between another plurality of conflicting data items, wherein the training uses the ranking of the data items in the set of conflicting data items as training data.

2. The method of claim 1, wherein the first user is an expert in a subject to which the plurality of conflicting items of data pertains.

3. The method of claim 1, wherein the two or more items of data provide different values for a same data attribute.

4. The method of claim 1, wherein the two or more items of data provide different answers for a same query.

5. The method of claim 1, wherein the rule prioritizes a first data source of the plurality of data sources over a second data source of the plurality of data sources, such that data items of the plurality of conflicting data items that are obtained from the first data source of the plurality of data sources are ranked more highly than data items of the plurality of conflicting data items that are obtained from the second data source of the plurality of data sources.

6. The method of claim 1, wherein the rule prioritizes data items that are newer over data items that are older, such that a first data item of the plurality of conflicting data items is ranked more highly than a second data item of the plurality of conflicting data items, and wherein the first data item has a more recent creation date than the second data item.

7. The method of claim 1, wherein the rule prioritizes data items that are older over data items that are newer, such that a first data item of the plurality of conflicting data items is ranked more highly than a second data item of the plurality of conflicting data items, and wherein the first data item has an earlier creation date than the second data item.

8. The method of claim 1, wherein metadata associated with the rule specifies at least one of: a subject to which the rule pertains, a date on which the rule was created, a date on which the rule was last modified, the first user, or a rating indicating a usefulness of the rule in deconflicting data in the past.

9. The method of claim 8, wherein the metadata associated with the rule is matched to metadata associated with at least one data item of the plurality of conflicting data items, prior to the ranking.

10. The method of claim 1, further comprising:
determining, by the processing system, whether the ranking is accurate.

11. The method of claim 10, wherein the determining is performed in accordance with feedback from a second user.

12. The method of claim 10, further comprising:
modifying, by the processing system, the rule to improve an accuracy of the ranking, when the determining concludes that the ranking is not accurate.

13. The method of claim 12, wherein the modifying is performed using feedback from a second user.

14. The method of claim 13, wherein the feedback specifies an alternative manner of ranking the data items in the set of conflicting data items.

15. The method of claim 10, further comprising:
saving, by the processing system the ranking, when the determining concludes that the ranking is accurate.

16. The method of claim 1, wherein the new rule indicates how to rank the another plurality of conflicting data items.

17. The method of claim 1, wherein the training additionally uses the rule as additional training data.

18. The method of claim 1, wherein the ranking indicates a data item in the set of conflicting data items that is most likely to be correct, without discarding remaining data items in the set of conflicting data items.

19. A non-transitory computer-readable medium storing instructions which, when executed by a processing system including at least one processor, cause the processing system to perform operations, the operations comprising:
defining, with guidance from a user, a rule for resolving a conflict between a plurality of conflicting items of data, wherein the plurality of conflicting items of data comprises two or more items of data that cannot simultaneously be true;

aggregating data from a plurality of data sources into a single pool of data;
detecting a set of conflicting data items in the single pool of data;
ranking data items in the set of conflicting data items, using the rule, wherein the ranking ranks the data items in the set of conflicting data items into a ranking of descending order from most reliable to least reliable; and
training a machine learning model to predict a new rule for resolving another conflict between another plurality of conflicting data items, wherein the training uses the ranking of the data items in the set of conflicting data items as training data.

20. A device comprising:
a processing system including at least one processor; and
a non-transitory computer-readable medium storing instructions which, when executed by the processing system, cause the processing system to perform operations, the operations comprising:
defining, with guidance from a user, a rule for resolving a conflict between a plurality of conflicting items of data, wherein the plurality of conflicting items of data comprises two or more items of data that cannot simultaneously be true;
aggregating data from a plurality of data sources into a single pool of data;
detecting a set of conflicting data items in the single pool of data;
ranking data items in the set of conflicting data items, using the rule, wherein the ranking ranks the data items in the set of conflicting data items into a ranking of descending order from most reliable to least reliable; and
training a machine learning model to predict a new rule for resolving another conflict between another plurality of conflicting data items, wherein the training uses the ranking of the data items in the set of conflicting data items as training data.

* * * * *